United States Patent
Pelissier et al.

(10) Patent No.: US 10,142,117 B2
(45) Date of Patent: Nov. 27, 2018

(54) INFORMATION HANDLING SYSTEM SELECTIVE LOCAL AND REMOTE CHARGER CONTROL

(71) Applicant: Dell Products L.P., Round Rock, TX (US)

(72) Inventors: Gerald R. Pelissier, Mendham, NJ (US); Kevin M. Turchin, III, Cedar Park, TX (US); Lawrence E. Knepper, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 157 days.

(21) Appl. No.: 15/095,763

(22) Filed: Apr. 11, 2016

(65) Prior Publication Data
US 2017/0295028 A1    Oct. 12, 2017

(51) Int. Cl.
*H04L 12/10* (2006.01)

(52) U.S. Cl.
CPC .................................. *H04L 12/10* (2013.01)

(58) Field of Classification Search
CPC ....................................................... H04L 12/10
See application file for complete search history.

(56) References Cited

U.S. PATENT DOCUMENTS

| | | | | |
|---|---|---|---|---|
| 2002/0050936 A1* | 5/2002 | Kato | ........................ | G06F 1/266 341/100 |
| 2009/0039709 A1* | 2/2009 | Wang | ...................... | H02J 1/108 307/80 |
| 2009/0063877 A1* | 3/2009 | Lewis | ...................... | G06F 1/266 713/310 |
| 2009/0108677 A1* | 4/2009 | Walter | ................ | H02M 3/1582 307/80 |
| 2010/0060233 A1* | 3/2010 | Kung | .................... | H02J 7/0052 320/107 |
| 2010/0164284 A1* | 7/2010 | Lee | ......................... | G06F 1/266 307/38 |
| 2013/0035802 A1* | 2/2013 | Khaitan | .................. | G06F 1/263 700/297 |
| 2013/0082643 A1* | 4/2013 | Cha | ........................ | H02J 7/0068 320/107 |
| 2013/0154550 A1* | 6/2013 | Balmefrezol | ........... | G06F 1/263 320/107 |
| 2013/0275779 A1* | 10/2013 | He | ............................ | G06F 1/26 713/300 |

(Continued)

OTHER PUBLICATIONS

Leihigh," what affects a computer performance," 2007, pp. 1-3.*

*Primary Examiner* — Thienvu Tran
*Assistant Examiner* — Pinping Sun
(74) *Attorney, Agent, or Firm* — Zagorin Cave LLP; Robert W. Holland

(57) ABSTRACT

A portable information handling system selectively accepts power transferred from an external device through a port, such as USB TYPE C™ port, with one of a first or second power configuration. The first power configuration accepts power regulated by a charger of an external device and routed directly to a system bus and battery of the portable information handling system. The second power configuration accepts power regulated by an internal charger of the portable information handling system, such as a narrow voltage direct current charger.

16 Claims, 3 Drawing Sheets

(56) References Cited

U.S. PATENT DOCUMENTS

| | | | |
|---|---|---|---|
| 2013/0334883 A1* | 12/2013 | Kim | H02J 7/34 307/29 |
| 2014/0095899 A1* | 4/2014 | Sultenfuss | G06F 1/266 713/300 |
| 2015/0008749 A1* | 1/2015 | Rhee | G06F 1/266 307/80 |
| 2015/0046727 A1* | 2/2015 | Kobayashi | G06F 1/266 713/300 |
| 2015/0137598 A1* | 5/2015 | Hawawini | G01R 31/00 307/31 |
| 2015/0194839 A1* | 7/2015 | Wojcik | H02J 7/025 320/108 |
| 2016/0043586 A1* | 2/2016 | Wang | H02J 7/0052 320/107 |
| 2016/0094071 A1* | 3/2016 | Nge | H02J 7/0052 320/107 |
| 2016/0216757 A1* | 7/2016 | Kim | G06F 1/3287 |
| 2017/0040817 A1* | 2/2017 | Hu | H02J 7/0006 |
| 2017/0085098 A1* | 3/2017 | Sporck | H02J 7/007 |
| 2017/0185126 A1* | 6/2017 | Trethewey | G06F 1/28 |
| 2017/0293335 A1* | 10/2017 | Dunstan | G06F 1/266 |

* cited by examiner

INFORMATION HANDLING SYSTEM SELECTIVE LOCAL AND REMOTE CHARGER CONTROL

BACKGROUND OF THE INVENTION

Field of the Invention

The present invention relates in general to the field of information handling system power management, and more particularly to an information handling system selective local and remote charger control.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically operate on external power when available and an internal power source, such as a battery, when external power is not available. Conventional external power sources for portable information handling systems typically convert alternating current (AC) into direct current (DC) with an external adapter that feeds DC power to the portable information handling system through a power port. Large AC-to-DC power adapters often provide power in excess of 100 W so that the portable information handling system has sufficient power available to fully operate all integrated components while simultaneously charging the integrated battery. During power transfer to run components or charge a battery with an external charger, some power inefficiencies occur as power is converted from AC to DC and converted between DC voltage levels used by each subsystem within an information handling system. End users feel this inefficiency in the form or thermal energy released at the external adapter or the system housing. Conventional portable information handling system charger configurations have an external AC-to-DC adapter that provides DC power at a constant power-in voltage and an integrated charger that manages current in and adapts voltage as needed for internal use. Generally portable information handling systems attempt to minimize power loss at an internal charger by using a narrow voltage DC (NVDC) charger that provides battery voltage for charge and running the system. In many cases, the external adapter includes communication logic so that power available from the adapter and the power capability of the information handling system are communicated before power transfer begins, such as a CC link supported through a USB TYPE C™ connector.

Recently, many smaller portable information handling systems have adopted peripheral data ports for use as power ports. For example, many smartphone and tablet portable information handling systems have a single USB port that couples though a USB cable to an external power adapter for accepting DC power. Advantageously, an end user is able to couple the portable system to another portable system to both transfer data and receive external power. With conventional USB 2.0 ports, power transfer is typically limited to one direction, i.e., into the portable system, and limited to USB standard transfer currents, such as 500 mA, 900 mA, or 1.5 A. Standard USB 2.0 ports perform a standardized power handshake in order to negotiate the power transfer capabilities of the power source and sink, thus ensuring that at an overcurrent condition does not arise. In order to address the increased power use of portable information handling system, recently-developed USB 3.0 includes a Type C connector rated for power transfer of 100 W. Further, the Type C connector supports two-way power transfer so that a portable information handling system can both receive power from and transfer power to an external device coupled through a USB cable. The USB controllers on each of the systems performs a handshake through the CC link to negotiate power transfer capabilities so that power transfer is available at appropriate levels in both directions.

The introduction of two-way power transfer through data ports, such as supported by a CC link of USB 3 Type C connectors, provides improved control of power transfer so that charging logic can be implemented in the adapter instead of the information handling system. For example, a charger located on an external adapter receives information about battery charge state through a communication link, and adapts charger voltage and current values to that needed for charging the battery. External power control provides some improved power transfer efficiencies since the information handling system does not have to convert the voltage of the incoming power to match battery charging needs. Reducing the number of power conversions reduces loss related to buck and boost charger conversions within the information handling system. External power control also allows increased voltage and current levels that provide a more rapid charge rates. The elimination of the charger from within the information handling system reduces housing size, system expense and thermal protection design.

SUMMARY OF THE INVENTION

Therefore, a need has arisen for a system and method which provides an information handling system external adapter power input that selectively manages charger control internal to an information handling system.

In accordance with the present invention, a system and method are provided which substantially reduce the disadvantages and problems associated with previous methods and systems for selectively managing charging at an information handling system. An information handling system power system selectively directs power through an integrated charger or bypasses the integrated charger based upon capabilities of an external charging device. Bypassing the integrated charger reduces thermal stress of the information handling system that receives power by eliminating internal power boost and buck operations that are externally managed.

More specifically, a portable information handling system selectively receives power under remote or local charger control based upon a power transfer negotiation performed with a power source, such as a power adapter or another information handling system. If the power source supports remote charger management, then a power manager in the portable information handling system establishes a direct power transfer from a port that receives power to a system bus that provides power to a battery and processing components. The direct power transfer bypasses an integrated charger of the portable information handling system so that thermal stress within the information handling system is reduced by avoiding internal boost and buck operations. If the external power source does not support remote charger management or if remote charger management is otherwise not desired, then power transfer is directed through an integrated charger of the portable information handling system so that charging is maintained within constraints determined locally by the integrated charger.

The present invention provides a number of important technical advantages. One example of an important technical advantage is that a portable information handling system selectively receives power under remote or local charger control to adapt to environmental charging conditions. External power transfer management, such as by a charger located in a power source device, allows increased power transfer rates by moving thermal stress related to boost and buck operations out of the information handling system and to the external power source. Reduced internal thermal stress allows increase power transfer rates so that the portable information handling system charges more rapidly and runs with improved performance. Local charging capabilities remain available by directing power-in through an integrated charger if an external power source cannot support remote charger management or if remote charger management is undesirable due to one or more predetermined conditions, such external device thermal conditions or power drain.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system manages external power to charge an integrated battery using an external power source by selectively controlling the charge voltage and current with one of an integrated charger or an external charger associated with the external power source. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
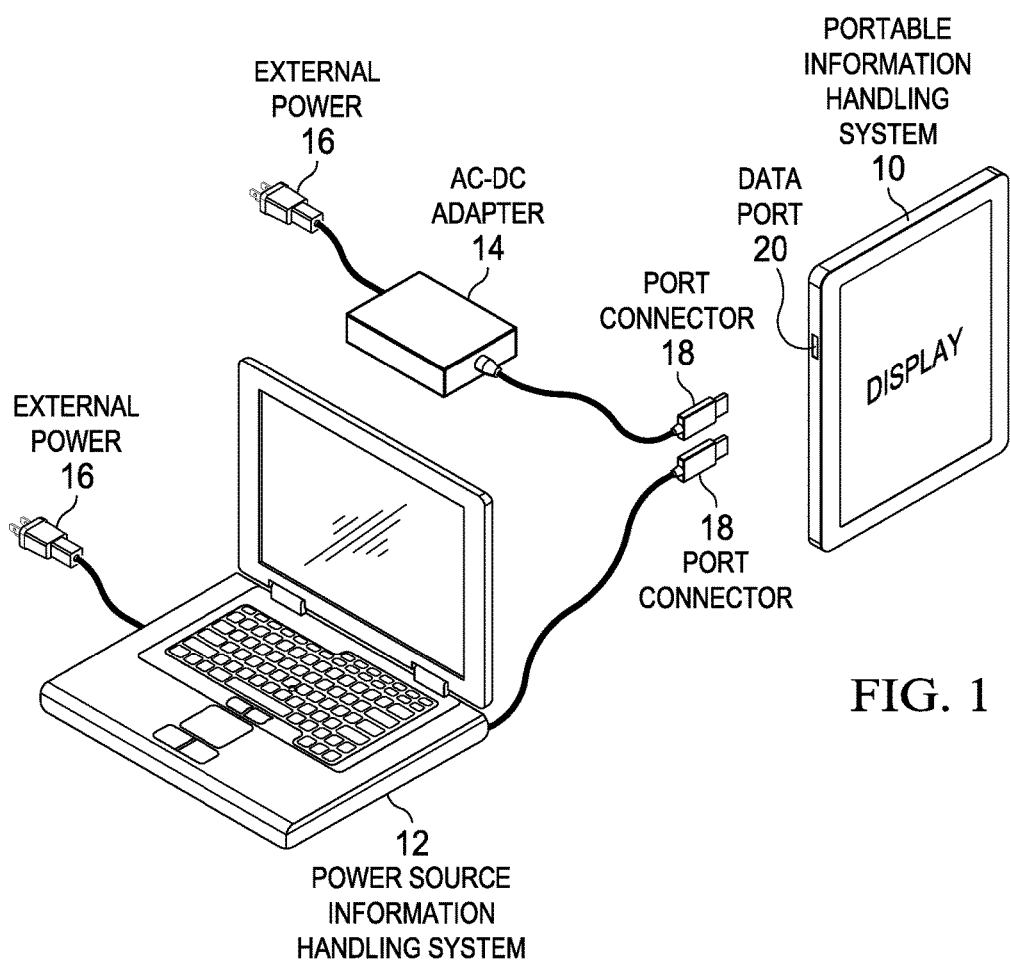
FIG. 1 depicts a portable information handling system coupled to an external power source to receive power managed by one of an external or integrated charger.

Referring now to FIG. 1, a portable information handling system 10 couples to an external power source to receive power managed by one of an external or integrated charger. In the example embodiment, portable information handling system 10 has a tablet form factor that includes processing components within a planar housing covered by a touchscreen display that presents output as visual images and accepts inputs at touches, such as key inputs made to an image of a keyboard. One example of a power source for information handling system 10 is a second information handling system 12 having a laptop configuration. Another example of a power source for information handling system 10 is an AC-to-DC adapter 14 that converts alternating current to direct current. In the example embodiment, both information handling system 12 and adapter 14 accept external power 16 and convert the external power to an appropriate voltage and current for transfer to information handling system 10. In alternative embodiments, power transfer may be supported to information handling systems 10 having other types of form factors, such as laptop or convertible form factors, and power transfer may be supported from other types of external devices to an information handling system 10, such as docking stations, peripherals, etc.

In the example embodiment, portable information handling system 10 receives power from a port connector 18 coupled to a data port 20, such as a USB 3.0 Type C connector and port. Power transfer to portable information handling system 10 is managed by a power protocol negotiation or handshake, such as those defined in the USB standards. Because portable information handling system 10 has a small footprint and passive release of excess thermal energy, standards based USB charging is performed at a restricted power transfer rate, such as 2 A. A standard USB TYPE C™ power transfer, such as at 5V, 12V or 20V, relies upon a boosting or bucking within portable information handling system 10 in order to translate power-in to an appropriate charge level for the battery within portable information handling system 10, such as 3.7V for a 1S battery, 7.4V or a 2S battery, 11.1V for a 3S battery, etc. Inefficiencies associated with a boost and/or buck of voltages within portable information handling system 10 result in release of thermal energy so that restriction of power-in prevents an excessive internal thermal state.

In order to provide more rapid power transfer, portable information handling system 10 includes a power system that distributes charging logic through the USB interface, such as a standards based CC communication link, to a charger managed by an external device, such as information handling system 12 or adapter 14. For example, an external device charger receives battery charge state information from portable information handling system 10 and provides charging voltage and current values directly to the power bus of portable information handling system 10 so that boost and buck operations are not performed within portable information handling system 10. The effect of the distribution of charging logic and power translation external to portable information handling system 10 is to allow a greater power transfer rate by distributing thermal inefficiencies outside of portable information handling system 10 and to the power source, such as information handling system 12 and adapter 14. In one example embodiment, by eliminating power translation at an internal charger, portable information handling system 10 increases power-in from a 2 A level to a 5 A level for more rapid charging and improved performance when the system operates on external power.

Once portable information handling system 10 has negotiated both internal and distributed charger logic, both portable information handling system 10 and/or the power sources 12 and 14 may selectively enable local or distributed charger control based upon environmental or other considerations. For example, if an external power source has thermal or power distribution limitations, the external power source may refuse to accept distributed charger logic functions. As another example, the relative power and thermal efficiencies for localized and distributed charger control are coordinated between portable information handling system 10 and an external power source so that an optimized power transfer may be effected. In various embodiments, various conditions and considerations may be applied at both portable information handling system 10 and an external power source when configuring power transfer.

Figure 2:
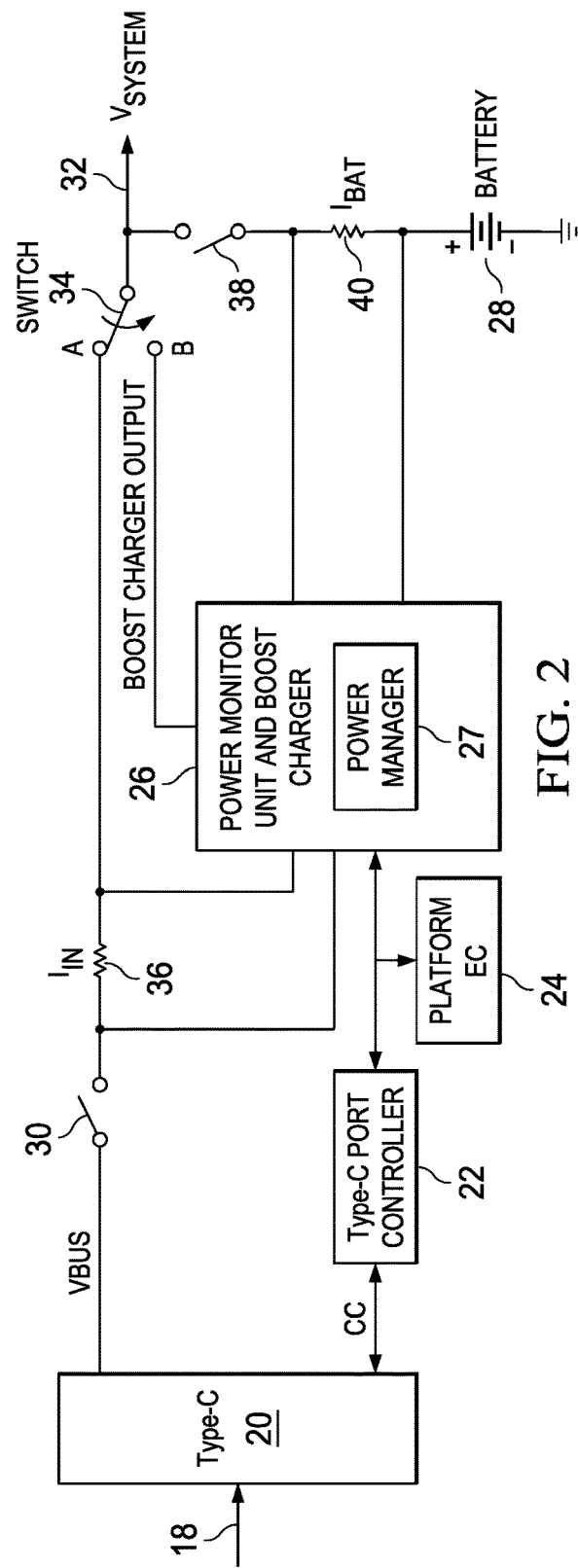
FIG. 2 depicts a block diagram of an information handling system power system that selectively charges a battery with voltage and current control from an external charger or an integrated charger.

Referring now to FIG. 2, a block diagram depicts an information handling system power system that selectively charges a battery 28 with voltage and current control from an external charger or an integrated charger 26, such as a narrow voltage direct current (NVDC) charger. External power transfers from connector 18 to port 20 under the management of an external charger or in accordance with standardized USB TYPE C™ port transfers. The type of power transfer and charger control is coordinated through a port controller 22, such as a USB TYPE C™ port controller that communicates through a CC link. In the example embodiment, system power management is provided by a platform embedded controller 24, such as under the management of a Basic Input/Output System (BIOS) firmware manager that controls a power monitor unit and boost charger 26. For example, BIOS power management running on embedded controller 24 receives power transfer capabilities through CC communications of port controller 22 and coordinates power transfer through standardized USB transfer protocols with a power manager 27 firmware module executing on charger 26. Power manager 27 implements power transfer through charger 26 boost and/or buck operations based upon power states detected at various switches and bus locations. For example a power-in switch 30 allows power received at port 20 to pass to a Vbus for communication to a system power bus Vsys. Power-in is monitored with a current sense resistor Iin 36. Power to and from battery 28 is controlled with a battery power switch 38 and monitored by a battery current sense resistor Ibat 40. Although the example embodiment depicts power manager 27 as a firmware module that runs on charger 26, in alternative embodiments, the logic described as controlled by power manager 27 may be distributed to other processing components, such as embedded controller 24. In one example embodiment, switch 30 is a multiplexer that selects one of plural ports to provide power to the system bus or charger. Multiplexing power-in may take place for one or more external USB TYPE C™ ports so that power transfer is performed through a single charger and system bus interface.

In operation, power manager 27 is commanded by embedded controller 24 to establish power transfer from port 20 through either direct transfer having remote charger control of voltage and current levels into Vsys 32 or an indirect transfer having local charger management of voltage and current levels. If a direct power transfer is commanded, then power manager 27 closes switch 30 to enable power-in and positions switch 34 to position A so that power transfer is directed to Vsys 32 without passing through charger 26. Power manager 27 monitors current sense resistors 36 and 40 to provide power state feedback through port controller 22 CC communications to the external charger. In this manner, direct power transfer to charge battery 28 is provided without boost and/or buck operations at charger 26 and the associated thermal issues and power inefficiencies. If remote charger management is not available or desired, power manager 27 positions switch 34 to position B so that power-in is directed from port 20 through charger 26 and then to Vsys 32. Power manager 27 may direct power transfer through charger 26 where external charger control is not available or not desired. In various embodiments, power manager 27 may select external or internal charger control based upon conditions within information handling system 10 or conditions communicated from the external power source. For example, if thermal conditions at an external power source are unfavorable and power consumption at information handling system 10 is within the capabilities of charger 26, power manager 27 may initiate local charger control to relieve the external power source of thermal stress.

Figure 3:
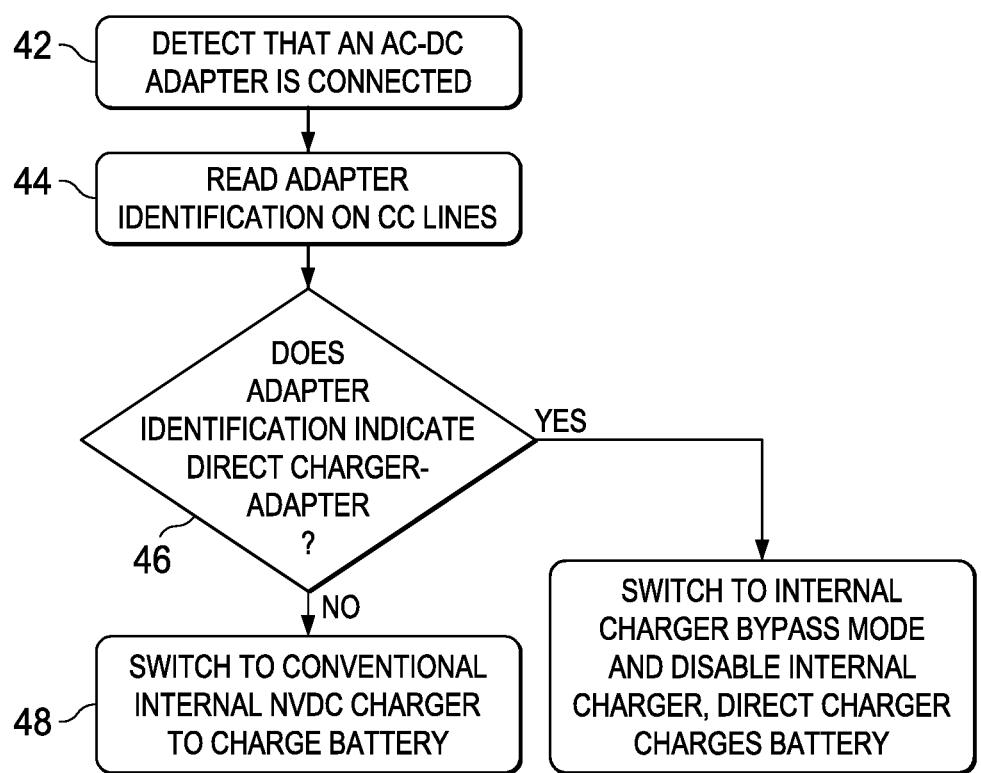
FIG. 3 depicts a flow diagram of a process for selecting charger control at a portable information handling system.

Referring now to FIG. 3, a flow diagram depicts a process for selecting charger control at a portable information handling system. At step 42 an external power source, such as an AC-to-DC adapter, is detected at the information handling system. At step 44, an identifier is read from the adapter by the information handling system through a communication link, such as USB 3 Type C connector CC communication link. The adapter identifier indicates the adapter capabilities, which may include just USB protocol power transfer, just direct power transfer with adapter charger control, or both a capability to support local and remote charger control of power transfer. At step 46, a determination is made of whether the adapter identifier indicates a direct power transfer capability that supports adapter-based charger management. The determination of step 46 may include communication of charge characteristics and identifiers for the power-receiving information handling system. If not, the process completes at step 48 by moving the power management switch to provide power transfer through the local charger. If at step 46 the adapter identifier indicates an ability to support remote charger management, the process continues to step 50 move the power management switch so that power-in from the port bypasses the internal charger to perform direct power transfer to the system bus and battery.

Although the present invention has been described in detail, it should be understood that various changes, substitutions and alterations can be made hereto without departing from the spirit and scope of the invention as defined by the appended claims.

What is claimed is:

1. A portable information handling system comprising:
a housing;

a processor disposed in the housing and operable to execute instructions to process information;

a memory disposed in the housing and interfaced with the processor, the memory operable to store the information;

a port disposed at the housing and operable to accept an external cable;

a port controller interfaced with the port and operable to communicate with one or more external devices through the external cable;

a charger interfaced with the port and operable to accept power provided to the port and convert the power to a system voltage;

a switch interfaced with the port to selectively direct the power from the port to one of either the charger or a system bus; and a power manager interfaced with the port controller and the switch, the power manager comprising one or more processing components executing instructions stored in non-transitory memory to selectively direct the power with the switch based at least in part on information communicated with the one or more external devices through the port;

wherein the information communicated with the one or more external devices comprises an identifier of the information handling system associated with power sink capabilities of the information handling system.

2. The portable information handling system of claim 1 wherein the switch comprises a multiplexer that selectively interfaces one of plural ports with one of the charger and the system bus.

3. The portable information handling system of claim 1 wherein the charger comprises a narrow voltage direct current charger.

4. The portable information handling system of claim 1 wherein the information communicated with the one or more external devices comprises an identifier of the one or more external devices associated with power source capabilities of the external device.

5. The portable information handling system of claim 1 wherein the information communicated from the one or more external devices comprises an available power capacity of the one or more external devices to provide the power to the port.

6. The portable information handling system of claim 1 wherein the power manager selectively directs power based in part on a charge state of a battery integrated in the information handling system.

7. An information handling system power system comprising:
a battery;
a port operable to interface with an external power supply;
a charger operable to convert power received from the external power supply to an internal power supply voltage;
a switch operable to selectively connect the external power supply with one of the charger or the battery; and
a power manager comprising one or more processing components executing instructions stored in non-transitory memory and interfaced with the switch to select a connection to the charger or the battery based at least in part on information communicated with the external power supply;

wherein the information communicated with the external power supply comprises an identifier associated with the power transfer characteristics of the charger.

8. The portable information handling system power system of claim 7 wherein the power manager comprises firmware executing on a port controller.

9. The portable information handling system power system of claim 7 wherein the power manager is further operable to:
establish power transfer to the battery with a direct connection of the external power supply; and
selectively reconfigure the power transfer through the charger based upon one or more predetermined conditions.

10. The portable information handling system power system of claim 7 wherein the port comprises a Type C port.

11. The portable information handling system power system of claim 7 wherein the charger comprises a narrow voltage direct current charger.

12. A portable information handling system comprising:
a housing;
a processor disposed in the housing and operable to execute instructions to process information;
a memory disposed in the housing and interfaced with the processor, the memory operable to store the information;
a port disposed at the housing and operable to accept an external cable;
a port controller interfaced with the port and operable to communicate with one or more external devices through the external cable;
a charger interfaced with the port and operable to accept power provided to the port and convert the power to a system voltage;
a switch interfaced with the port to selectively direct the power from the port to one of either the charger or a system bus; and
a power manager interfaced with the port controller and the switch, the power manager comprising one or more processing components executing instructions stored in non-transitory memory to selectively direct the power with the switch based at least in part on information communicated with the one or more external devices through the port;
wherein the power manager selectively directs power based in part on a charge state of a battery integrated in the information handling system.

13. The portable information handling system of claim 12 wherein the switch comprises a multiplexer that selectively interfaces one of plural ports with one of the charger and the system bus.

14. The portable information handling system of claim 12 wherein the charger comprises a narrow voltage direct current charger.

15. The portable information handling system of claim 12 wherein the information communicated with the one or more external devices comprises an identifier of the one or more external devices associated with power source capabilities of the external device.

16. The portable information handling system of claim 12 wherein the information communicated from the one or more external devices comprises an available power capacity of the one or more external devices to provide the power to the port.

* * * * *